US012559382B2

(12) United States Patent
Jiang et al.

(10) Patent No.: US 12,559,382 B2
(45) Date of Patent: Feb. 24, 2026

(54) METHOD FOR MAKING YTTRIUM ALUMINUM GARNET (YAG) NANOPOWDERS

(71) Applicant: Wuhan Institute of Technology, Wuhan (CN)

(72) Inventors: Xingmao Jiang, Wuhan (CN); Shengjun Yi, Wuhan (CN); Lang Yang, Wuhan (CN); Biyi Chen, Wuhan (CN); Jin'e Tan, Wuhan (CN); Pincai Lai, Wuhan (CN); Long Chen, Wuhan (CN); Jinjian Pan, Wuhan (CN)

(73) Assignee: Wuhan Institute of Technology, Wuhan (CN)

( * ) Notice: Subject to any disclaimer, the term of this patent is extended or adjusted under 35 U.S.C. 154(b) by 658 days.

(21) Appl. No.: 17/984,707

(22) Filed: Nov. 10, 2022

(65) Prior Publication Data
US 2023/0144242 A1 May 11, 2023

(30) Foreign Application Priority Data
Nov. 10, 2021 (CN) .......................... 202111326010.0

(51) Int. Cl.
*C01F 17/34* (2020.01)
*C01F 17/10* (2020.01)

(52) U.S. Cl.
CPC .............. *C01F 17/34* (2020.01); *C01F 17/10* (2020.01); *C01P 2002/30* (2013.01); *C01P 2004/64* (2013.01)

(58) Field of Classification Search
CPC ...... C01F 17/34; C01F 17/10; C01P 2002/30; C01P 2004/64; C01P 2002/54; C01P 2002/72; C01P 2004/61; C01P 2004/62; C04B 35/44; C04B 2235/3224; C04B 2235/3225; C04B 2235/5454;
(Continued)

(56) References Cited

U.S. PATENT DOCUMENTS

| | | | | |
|---|---|---|---|---|
| 2006/0145124 A1* | 7/2006 | Hsiao | ..................... | C09K 11/77 |
| | | | | 252/301.4 R |
| 2019/0176231 A1* | 6/2019 | Jiang | ......................... | C08L 1/28 |

FOREIGN PATENT DOCUMENTS

| | | | | | |
|---|---|---|---|---|---|
| CN | 112250043 A | * | 1/2021 | ............ | C01F 17/235 |
| WO | WO-2015080780 A2 | * | 6/2015 | .............. | B01J 19/08 |

* cited by examiner

*Primary Examiner* — Daniel C. Mccracken
*Assistant Examiner* — Starfari Teshawn Mcclain
(74) *Attorney, Agent, or Firm* — ANOVA LAW GROUP, PLLC

(57) ABSTRACT

A method for making yttrium aluminum garnet (YAG) nanopowders, includes mixing carbohydrate and organic amine in a container according to a first ratio, stirring the carbohydrate and organic amine in the container under a heating condition for 2 minutes to 120 minutes for melting the carbohydrate and the organic amine to obtain a clear and transparent mixed solution, adding yttrium salt and aluminum salt at a second ratio to the clear and transparent mixed solution, and stirring the yttrium salt, the aluminum salt, and the clear and transparent mixed solution in the container under the heating condition for 5 minutes to 120 minutes to form a uniform molten mixture, heating the uniform molten mixture to dehydrate and carbonize the carbohydrate to obtain a dark brown fluffy solid, and performing a heat treatment on the dark brown fluffy solid at 800° C. to 1500° C. to obtain the YAG nanopowders.

17 Claims, 5 Drawing Sheets

(58) Field of Classification Search
CPC ...... C04B 2235/764; C04B 2235/9646; C09K
11/7774; C09K 11/7792; Y02B 20/00;
B82Y 20/00; B82Y 40/00
See application file for complete search history.

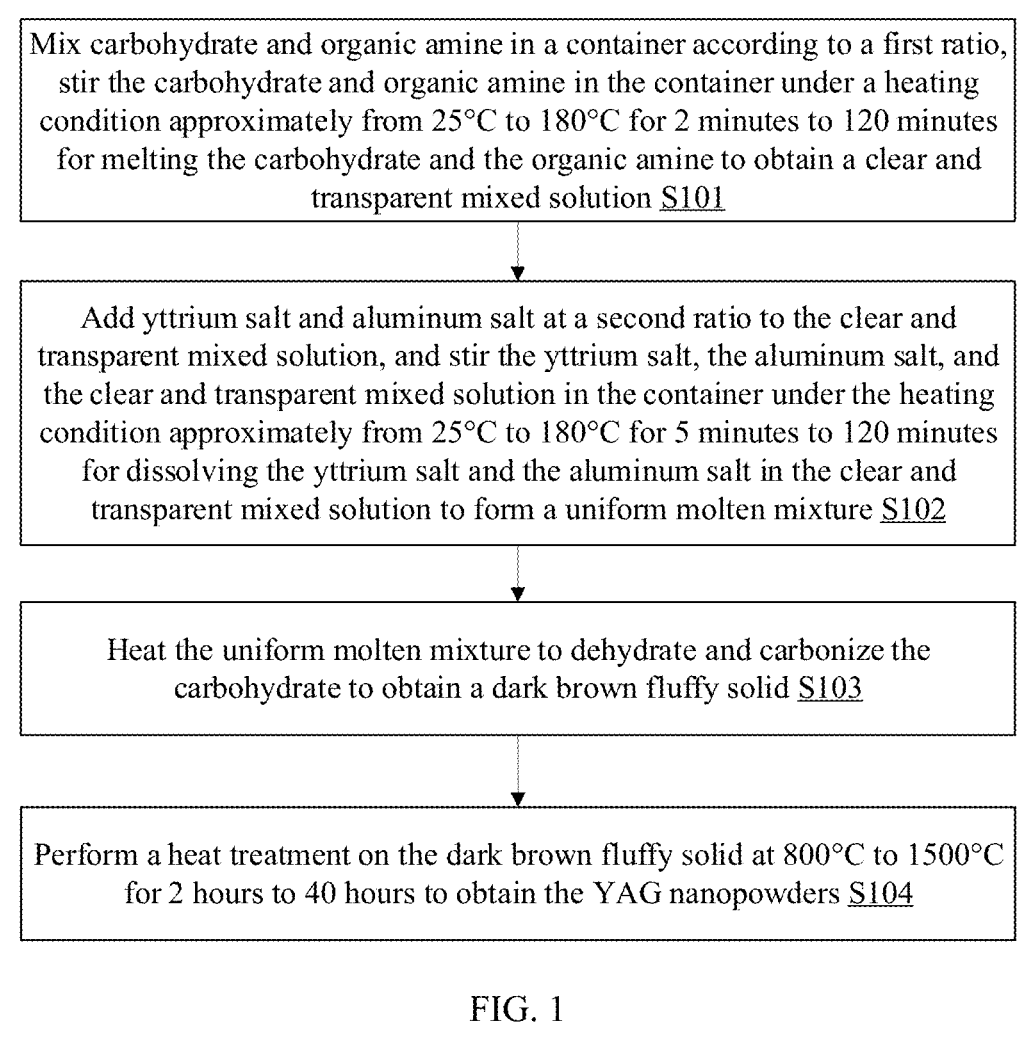

Mix carbohydrate and organic amine in a container according to a first ratio, stir the carbohydrate and organic amine in the container under a heating condition approximately from 25°C to 180°C for 2 minutes to 120 minutes for melting the carbohydrate and the organic amine to obtain a clear and transparent mixed solution S101

Add yttrium salt and aluminum salt at a second ratio to the clear and transparent mixed solution, and stir the yttrium salt, the aluminum salt, and the clear and transparent mixed solution in the container under the heating condition approximately from 25°C to 180°C for 5 minutes to 120 minutes for dissolving the yttrium salt and the aluminum salt in the clear and transparent mixed solution to form a uniform molten mixture S102

Heat the uniform molten mixture to dehydrate and carbonize the carbohydrate to obtain a dark brown fluffy solid S103

Perform a heat treatment on the dark brown fluffy solid at 800°C to 1500°C for 2 hours to 40 hours to obtain the YAG nanopowders S104

FIG. 1

METHOD FOR MAKING YTTRIUM ALUMINUM GARNET (YAG) NANOPOWDERS

CROSS-REFERENCE TO RELATED APPLICATION

The present application claims priority to Chinese Patent Application No. 202111326010.0, filed Nov. 10, 2021, the entire content of which is incorporated herein by reference.

TECHNICAL FIELD

The present disclosure relates to the field of making ceramic materials and, in particular, to a method for making yttrium aluminum garnet (YAG) nanopowders.

BACKGROUND

Yttrium Aluminum Garnet (YAG, $Y_3Al_5O_{12}$) belongs to a cubic crystal system and has a garnet-type structure. The YAG is widely used as an optical material because of optical properties, for example, high refraction and optical isotropy of the YAG. In existing transparent ceramic materials, the YAG has gradually attracted extensive attention and research because of advantages of high strength, small creep at high temperature, oxidation resistance, and low thermal conductivity of the YAG. The YAG is a potential fine-structure ceramic material.

YAG phosphors are mainly fluorescent materials for industrial production of white LEDs. However, due to the limitations of technology and cost, large-scale application of the YAG phosphors in LED devices has yet to be developed. Although a conventional solid-phase method has relatively simple process, low cost, and large output, a calcination temperature of the conventional solid-phase method is high and the agglomeration is serious. YAG particles obtained by a sol-gel method are uniform, and the particle size can reach nano-scale. However, the process of the sol-gel method is complicated, the efficiency is low, and the precursor calcination reaction is prone to hard agglomeration, which is not conducive to the later ceramic sintering. Advantages of a precipitation method are that the calcination temperature is low, the operation is simple, the cost is low, and it is easy to achieve large-scale production. However, in the precipitation method, it is difficult to control the appropriate pH value of the system to cause each component to settle evenly, and it is difficult to wash. YAG powders made by a hydrothermal method have good morphology, uniform particle size distribution, and good dispersibility. However, high temperature and high pressure required for the hydrothermal method cause high requirement of equipment and high cost, making it difficult to achieve large-scale production. The YAG made by a spray drying method has good fluidity, good filling, and high component uniformity. In most cases, in the spray drying method, a variety of binders, dispersants, and plasticizers need to be added. The process of the spray drying method is cumbersome, the making cycle is long, and it is easy to introduce impurities to affect the properties of the YAG powders and ceramics.

The YAG powders currently made by traditional methods all have one or more of serious agglomeration, irregular shape, poor powder fluidity and filling, unguaranteed purity, complex and tedious process flow, long making cycle, and other problems, which directly affect the properties of the YAG powders and ceramics.

SUMMARY

In accordance with the disclosure, there is provided a method for making yttrium aluminum garnet (YAG) nano-powders, includes mixing carbohydrate and organic amine in a container according to a first ratio, stirring the carbohydrate and organic amine in the container under a heating condition approximately from 25° C. to 180° C. for 2 minutes to 120 minutes for melting the carbohydrate and the organic amine to obtain a clear and transparent mixed solution, adding yttrium salt and aluminum salt at a second ratio to the clear and transparent mixed solution, and stirring the yttrium salt, the aluminum salt, and the clear and transparent mixed solution in the container under the heating condition approximately from 25° C. to 180° C. for 5 minutes to 120 minutes for dissolving the yttrium salt and the aluminum salt in the clear and transparent mixed solution to form a uniform molten mixture, heating the uniform molten mixture to dehydrate and carbonize the carbohydrate to obtain a dark brown fluffy solid, and performing a heat treatment on the dark brown fluffy solid at 800° C. to 1500° C. for 2 hours to 40 hours to obtain the YAG nanopowders.

BRIEF DESCRIPTION OF THE DRAWINGS

FIG. 1 is a schematic flow chart of a method for making yttrium aluminum garnet (YAG) nanopowders consistent with the embodiments of the disclosure.

DETAILED DESCRIPTION OF THE EMBODIMENTS

Figure 2:
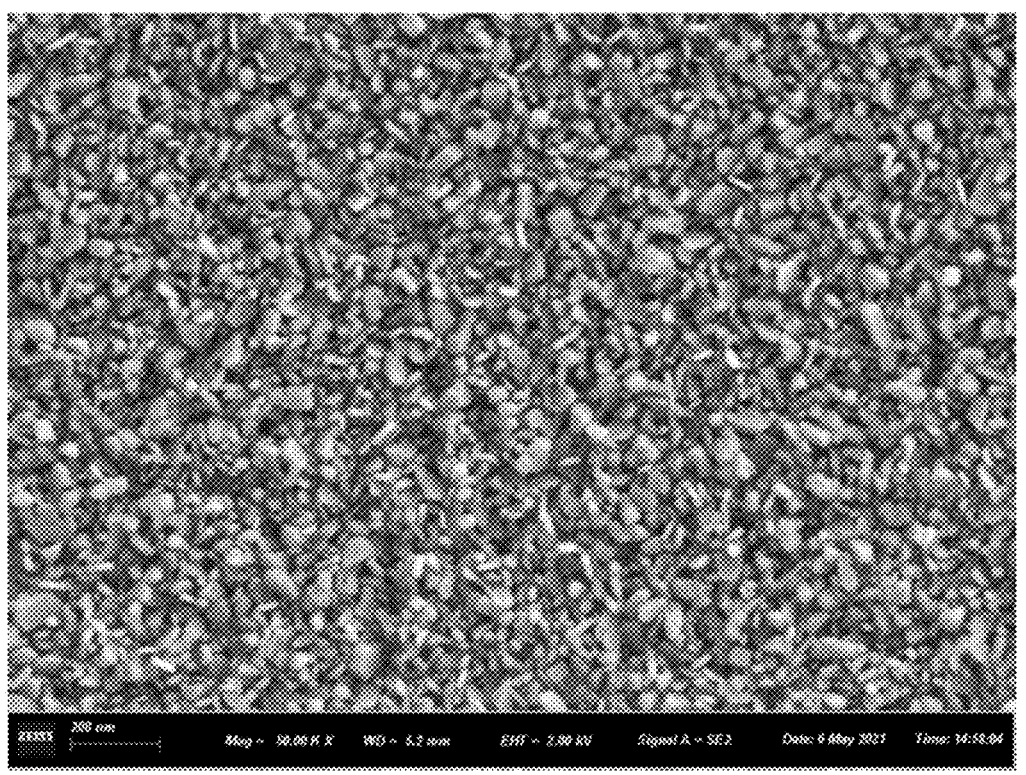
FIG. 2 is a scanning electron microscope (SEM) image of YAG made according to an example embodiment of the disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

FIG. 1 is a schematic flow chart of a method for making yttrium aluminum garnet (YAG) nanopowders consistent with the embodiments of the disclosure. As shown in FIG. 1, the method for making the YAG powders includes following processes.

At S101, carbohydrate and organic amine are mixed in a container according to a first ratio. The carbohydrate and organic amine in the container are stirred under a heating condition approximately from 25° C. to 180° C. for 2 minutes to 120 minutes for melting the carbohydrate and the organic amine to obtain a clear and transparent mixed solution.

In some embodiments, the carbohydrate includes at least one of glucose, sucrose, fructose, lactose, starch, maltose, or ribose.

In some embodiments, the organic amine includes at least one of aliphatic amine, alcohol amine, amide, alicyclic amine, aromatic amine, or naphthalene amine.

In some embodiments, the first ratio includes a mass ratio of the carbohydrate and the organic amine as 1:(0.1-50).

At S102, yttrium salt and aluminum salt at a second ratio are added to the clear and transparent mixed solution. The yttrium salt, the aluminum salt, and the clear and transparent mixed solution in the container are stirred under the heating condition approximately from 25° C. to 180° C. for 5 minutes to 120 minutes for dissolving the yttrium salt and the aluminum salt in the clear and transparent mixed solution to form a uniform molten mixture.

In some embodiments, the second ratio includes a molar ratio between yttrium in the yttrium salt and aluminum in the aluminum salt as 1:(1-4).

In some embodiments, in the process S102, rare earth salt or transition metal salt is added at a third ratio to the clear and transparent mixed solution.

In some embodiments, the third ratio includes a molar ratio between rare earth element in the rare earth salt or transition metal element in the transition metal salt and yttrium in the yttrium salt as 1:(10-300).

In some embodiments, the third ratio includes a ratio between total moles of yttrium in the yttrium salt, aluminum in the aluminum salt, and rare earth element in the rare earth salt or transition metal element in the transition metal salt, and moles of the carbohydrate as (0.2-3):1.

In some embodiments, the yttrium salt includes at least one of nitrate, sulfate, oxalate, acetate, phosphate, hypochlorite, or halide salt.

In some embodiments, the aluminum salt includes at least one of nitrate, sulfate, oxalate, acetate, phosphate, hypochlorite, or halide salt.

In some embodiments, the rare earth salt or transition metal salt includes at least one of nitrate, sulfate, oxalate, acetate, phosphate, hypochlorite, or halide salt.

At S103, the uniform molten mixture is heated to dehydrate and carbonize the carbohydrate to obtain a dark brown fluffy solid.

In some embodiments, the uniform molten mixture is heated to dehydrate and carbonize the carbohydrate to obtain the dark brown fluffy solid using at least one of high temperature carbonization, hydrothermal carbonization, or microwave carbonization.

In some embodiments, the uniform molten mixture is microwaved to dehydrate and carbonize the carbohydrate to provide a carbon templet to cause the yttrium salt and the aluminum salt to be evenly distributed on the carbon templet.

In some embodiments, the uniform molten mixture is microwaved to dehydrate and carbonize the carbohydrate to provide a carbon templet to cause the yttrium salt, the aluminum salt, and the rare earth salt or transition metal salt to be evenly distributed on the carbon templet.

At S104, a heat treatment is performed on the dark brown fluffy solid at 800° C. to 1500° C. for 2 hours to 40 hours to obtain the YAG nanopowders.

In some embodiments, the heat treatment is performed on the dark brown fluffy solid at 800-1500° C. for 2-40 hours to obtain the YAG nanopowders in at least one of an air atmosphere, an oxygen atmosphere, or an atmosphere with first inert gas and then air or oxygen.

In some embodiments, the obtained YAG nanopowders have a particle size of 20 nanometers to 5000 nanometers.

In some embodiments, the obtained YAG nanopowders have a particle size of 20 nanometers to 100 nanometers.

In some embodiments, the heat treatment is performed on the dark brown fluffy solid to remove the carbon templet.

Unless otherwise specified, experimental drugs in the following embodiments were obtained from the market and used directly.

In an example embodiment, 3.0 g (0.0167 mol) glucose and 5.0 g (0.0831 mol) urea were put in a beaker, and heated to 100° C. The glucose and the urea in the beaker were stirred and mixed for 20 minutes for melting to obtain a clear and transparent mixed solution. Then, 0.77 g (0.002 mol) yttrium nitrate hexahydrate and 1.26 g (0.0033 mol) aluminum nitrate nonahydrate were added to the clear and transparent mixed solution. The mixture in the beaker was heated and stirred at 100° C. for 120 minutes to cause the metal salt to be completely dissolved to form a uniform and viscous molten mixture. For example, the metal salt is completely dissolved to form a clear and transparent homogeneous solution. A molar ratio of yttrium in the yttrium nitrate hexahydrate to aluminum in the aluminum nitrate nonahydrate was 1:1.65. The obtained molten mixture in the beaker was microwaved for 10 minutes with a microwave power of 550 W, to cause the glucose to be dehydrated and carbonized to obtain a dark brown fluffy solid. After the microwave carbonization, the mixture was taken out of the microwave reactor and then naturally cooled to room temperature. Then the beaker was taken out from the microwave. The dark brown fluffy solid was then put into a box furnace for a heat treatment at 800° C. for 2 hours in an air atmosphere to obtain YAG nanopowders with a particle size of 20 nanometers.

FIG. 2 is scanning electron microscope (SEM) image of the YAG nanopowders made according to the above example embodiment. As shown in FIG. 2, the YAG nanopowders are well dispersed.

In another example embodiment, 3.0 g (0.0167 mol) glucose and 5.0 g (0.0831 mol) urea were put in a beaker, and heated to 100° C. The glucose and the urea in the beaker were stirred and mixed for 20 minutes for melting to obtain a clear and transparent mixed solution. Then, 0.77 g (0.002 mol) yttrium nitrate hexahydrate, 1.26 g (0.0033 mol) aluminum nitrate nonahydrate, and 0.01 g (0.000023 mol) cerium nitrate hexahydrate were added to the clear and transparent mixed solution. The mixture in the beaker was heated and stirred at 100° C. for 120 minutes to cause the metal salt to be completely dissolved to form a uniform and viscous molten mixture. A molar ratio of yttrium in the yttrium nitrate hexahydrate to aluminum in the aluminum nitrate nonahydrate was 1:1.65. A molar ratio of cerium in the cerium nitrate hexahydrate to the yttrium in the yttrium nitrate hexahydrate was 1:86.96. A ratio between the moles of the glucose and total moles of the yttrium in the yttrium nitrate hexahydrate, the aluminum in the aluminum nitrate nonahydrate, and the cerium in the cerium nitrate hexahydrate was 1:0.32. The obtained molten mixture in the beaker was microwaved for 4 minutes with a microwave power of 700 W, to cause the glucose to be dehydrated and carbonized to obtain a dark brown fluffy solid. Then the dark brown fluffy solid was put into a box furnace for a heat treatment at 800° C. for 2 hours in an air atmosphere to obtain rare-earth-doped YAG nanopowders, YAG: $Ce^{3+}$, with a particle size of 20 nanometers.

Figure 3:
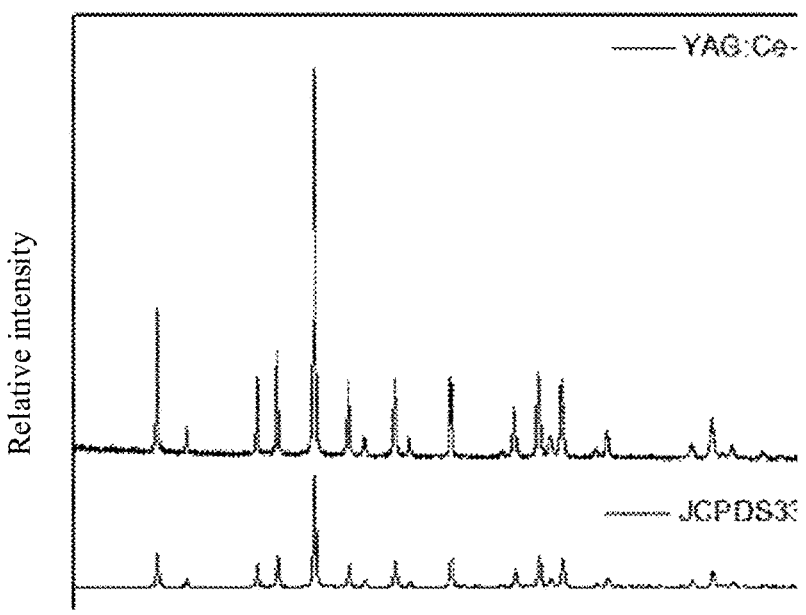
FIG. 3 is an X-ray crystallography (XRD) spectrum of YAG: $Ce^{3+}$-1 made according to another example embodiment of the disclosure.

FIG. 3 is an X-ray crystallography (XRD) spectrum of the YAG: $Ce^{3+}$-1 made according to the above example embodiment. As shown in FIG. 3, the product made in the above embodiment corresponds to a standard powder diffraction file (PDF) card, indicating that the made product is YAG: $Ce^{3+}$. A peak line is narrow and sharp, indicating a good crystal form of the made YAG: $Ce^{3+}$. There is no impurity peak, indicating that the obtained YAG: $Ce^{3+}$ has higher purity.

The only difference between following three example embodiments and the above example embodiment is that the calcination temperatures are 900° C., 1000° C., and 1100° C., respectively. Rare earth-doped YAG nanopowders YAG: $Ce^{3+}$-2, YAG: $Ce^{3+}$-3, and YAG: $Ce^{3+}$-4 are respectively made in the three example embodiments.

Figure 4:
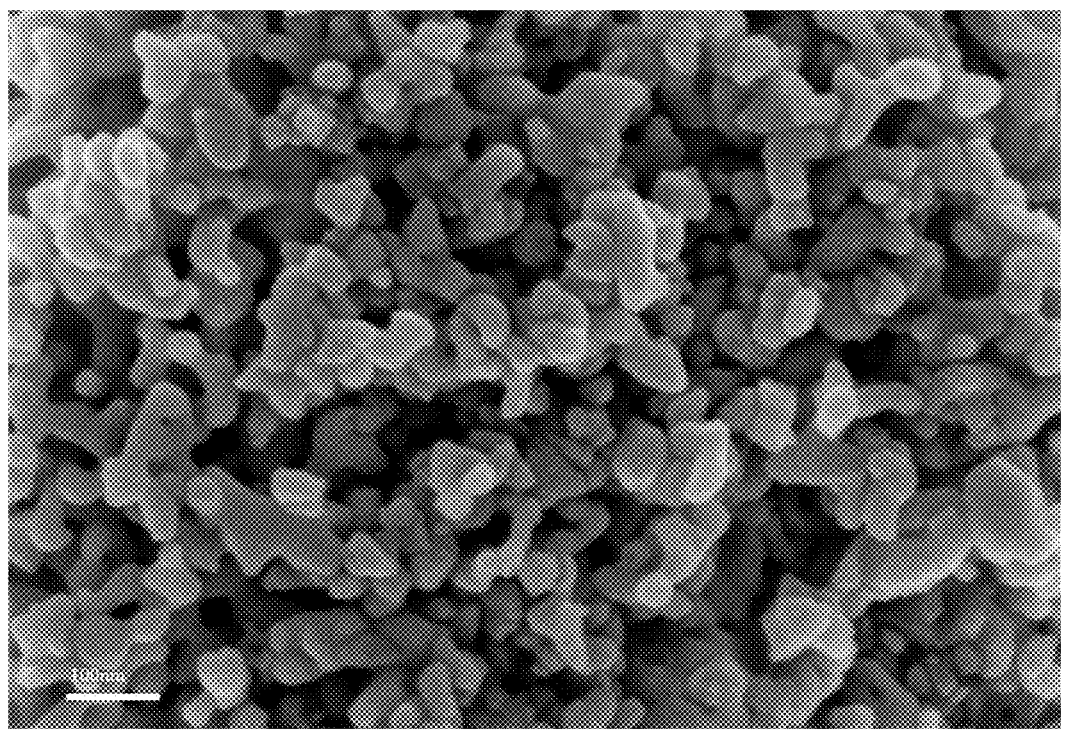
FIG. 4 is an SEM image of YAG: $Ce^{3+}$-4 made according to another example embodiment of the disclosure.

FIG. 4 is an SEM image of the YAG: $Ce^{3+}$-4 made according to another example embodiment of the disclosure. As shown in FIG. 4, particles of the obtained YAG: $Ce^{3+}$-4 are relatively small with a relatively uniform particle size and relatively good dispersibility.

Figure 5:
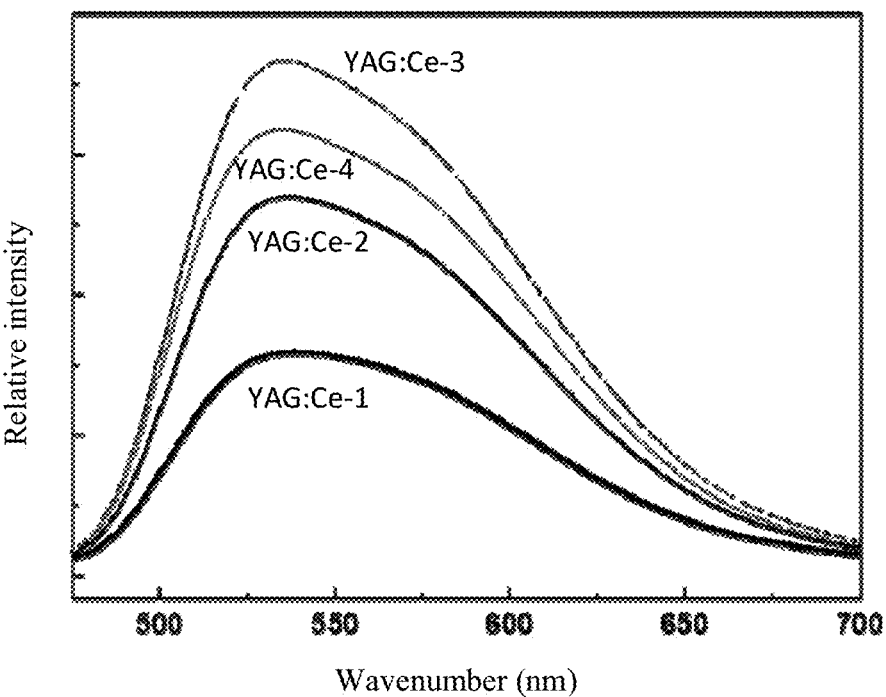
FIG. 5 is an emission fluorescence spectrum of YAG: $Ce^{3+}$ made according to the embodiments of the disclosure.

FIG. 5 is an emission fluorescence spectrum of YAG: $Ce^{3+}$ made according to the embodiments of the disclosure. As shown in FIG. 5, the made YAG: $Ce^{3+}$ has good fluorescence properties. The nanopowders with different fluorescence intensities can be obtained by adjusting the calcination temperature. As the calcination temperature increases, the fluorescence properties of the nanopowders are improved.

In another example embodiment, 1.0 g (0.0029 mol) sucrose and 10.0 g (0.166 mol) ethylenediamine were put in a beaker, and heated to 180° C. The sucrose and the ethylenediamine in the beaker were stirred and mixed for 120 minutes for melting to obtain a clear and transparent mixed solution. Then, 1.22 g (0.004 mol) yttrium chloride hexahydrate, 1.01 g (0.004 mol) aluminum isopropoxide, and 0.18 g (0.0004 mol) europium nitrate hexahydrate were added to the clear and transparent mixed solution. The mixture in the beaker was heated and stirred at 180° C. for 80 minutes to cause the metal salt to be completely dissolved to form a uniform and viscous molten mixture. A molar ratio of yttrium in the yttrium chloride hexahydrate to aluminum in the aluminum isopropoxide was 1:1. A molar ratio of europium in the europium nitrate hexahydrate to the yttrium in the yttrium chloride hexahydrate was 1:10. A ratio between the moles of the glucose and total moles of the yttrium in the yttrium chloride hexahydrate, the aluminum in the aluminum isopropoxide, and the europium in the europium nitrate hexahydrate was 1:2.89. The obtained molten mixture in the beaker was put in a 180° C. oven for 24 hours, to cause the sucrose to be dehydrated and carbonized to obtain a dark brown fluffy solid. The dark brown fluffy solid was then put into a box furnace for a heat treatment at 850° C. for 15 hours in an air atmosphere to obtain rare-earth-doped YAG nanopowders, YAG: $Eu^{3+}$, with a particle size of 70 nanometers.

Figure 6:
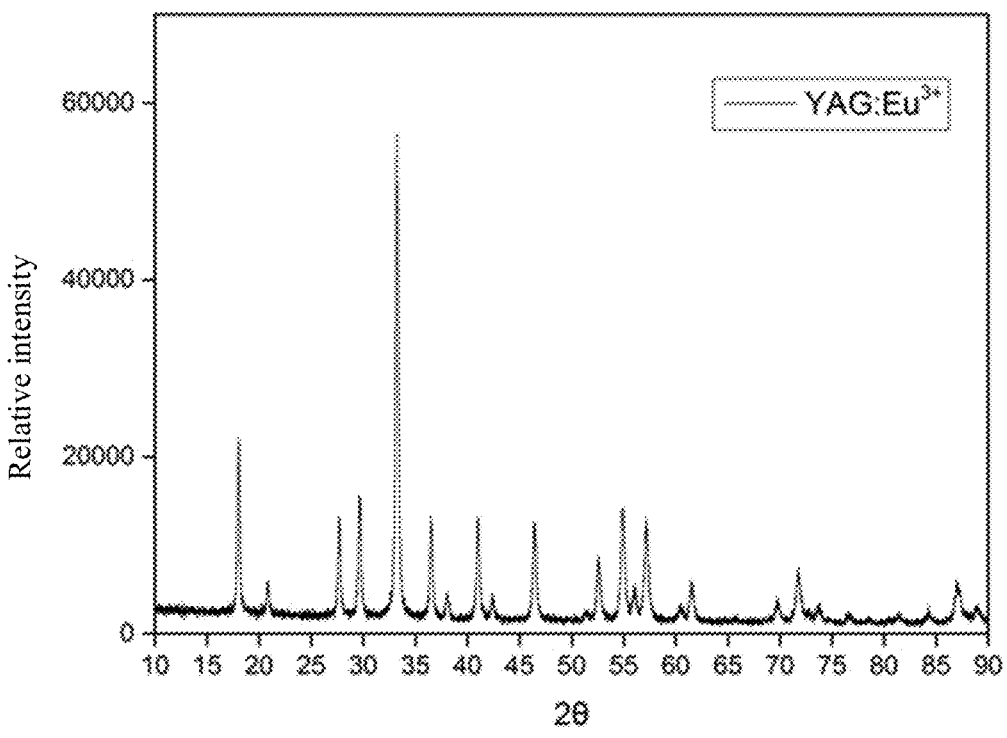
FIG. 6 is an XRD spectrum of YAG: $Eu^{3+}$ made according to another example embodiment of the disclosure.

FIG. 6 is an XRD spectrum of the YAG: $Eu^{3+}$ made according to the above example embodiment. As shown in FIG. 6, the obtained YAG: $Eu^{3+}$ has a good crystal form and no impurity peak.

In another example embodiment, 50.0 g (0.2775 mol) glucose and 5.0 g (0.0831 mol) ethanolamine were put in a beaker, and heated to 25° C. The glucose and the ethanolamine in the beaker were stirred and mixed for 25 minutes for melting to obtain a clear and transparent mixed solution. Then, 3.55 g (0.00803 mol) yttrium oxalate, 11.07 g (0.03212 mol) anhydrous aluminum sulfate, and 0.024 g (0.000054 mol) gadolinium nitrate hexahydrate were added to the clear and transparent mixed solution. The mixture in the beaker was heated and stirred at 25° C. for 120 minutes to cause the metal salt to be completely dissolved to form a uniform and viscous molten mixture. A molar ratio of yttrium in the yttrium oxalate to aluminum in the anhydrous aluminum sulfate was 1:4. A molar ratio of gadolinium in the gadolinium nitrate hexahydrate to the yttrium in the yttrium oxalate was 1:297.41. A ratio between the moles of the glucose and total moles of the yttrium in the yttrium oxalate, the aluminum in the anhydrous aluminum sulfate, and the gadolinium in the gadolinium nitrate hexahydrate was 1:0.29. The obtained molten mixture was transferred into a hydrothermal reaction kettle, and heated with water at 200° C. for 3 hours, to cause the glucose to be dehydrated and carbonized to obtain a dark brown fluffy solid. Then the dark brown fluffy solid was taken out from the hydrothermal reaction kettle. The dark brown fluffy solid was then put into a box furnace for a heat treatment at 900° C. for 20 hours in an oxygen atmosphere to obtain rare-earth-doped YAG nanopowders, YAG: $Gd^{3+}$, with a particle size of 120 nanometers.

Figure 7:
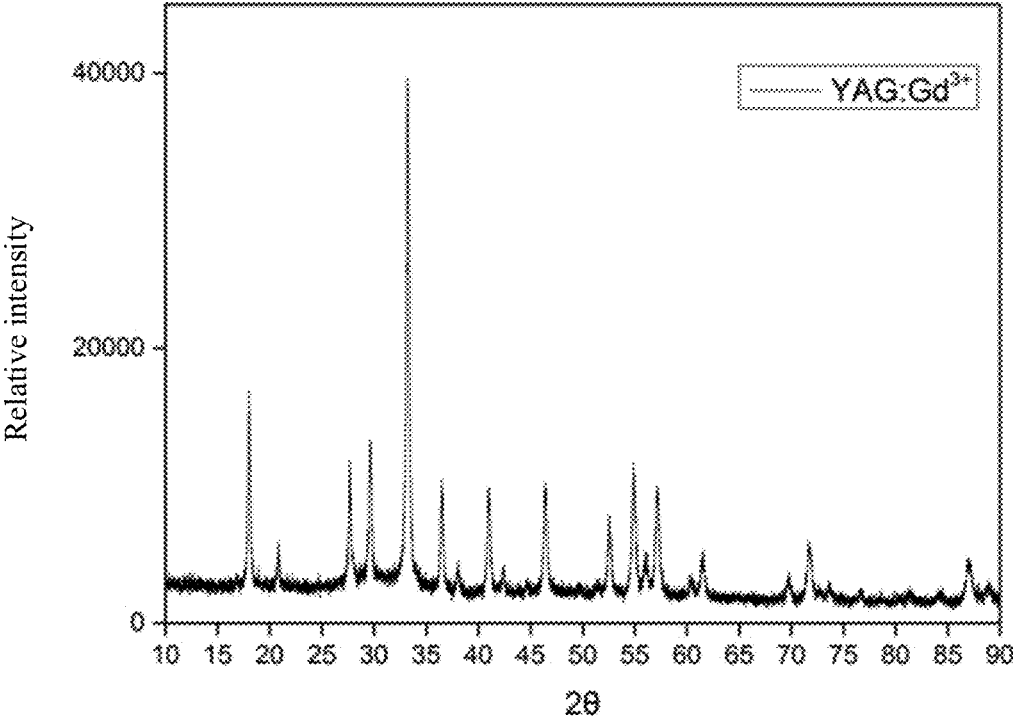
FIG. 7 is an XRD spectrum of YAG: $Gd^{3+}$ made according to another example embodiment of the disclosure.

FIG. 7 is an XRD spectrum of the YAG: $Gd^{3+}$ made according to the above example embodiment. As shown in FIG. 7, the obtained YAG: $Gd^{3+}$ has a good crystal form and no impurity peak.

In another example embodiment, 1.0 g (0.00555 mol) fructose and 50.0 g (0.167 mol) polyethyleneimine were put in a beaker, and heated to 108° C. The fructose and the polyethyleneimine in the beaker were stirred and mixed for 2 minutes for melting to obtain a clear and transparent mixed solution. Then, 0.62 g (0.001 mol) yttrium sulfate octahydrate, 1.81 g (0.0047 mol) aluminum nitrate nonahydrate, and 0.012 g (0.000027 mol) praseodymium nitrate hexahydrate were added to the clear and transparent mixed solution. The mixture in the beaker was heated and stirred at 108° C. for 5 minutes to cause the metal salt to be completely dissolved to form a uniform and viscous molten mixture. A molar ratio of yttrium in the yttrium sulfate octahydrate to aluminum in the aluminum nitrate nonahydrate was 1:2.35. A molar ratio of praseodymium in the praseodymium nitrate hexahydrate to the yttrium in the yttrium sulfate octahydrate was 1:74. A ratio between the moles of the fructose and total moles of the yttrium in the yttrium sulfate octahydrate, the aluminum in the aluminum nitrate nonahydrate, and the praseodymium in the praseodymium nitrate hexahydrate was 1:1.21. The obtained molten mixture in the beaker was microwaved for 8 minutes with a microwave power ranging between 1 kW and 100 kW, to cause the fructose to be dehydrated and carbonized to obtain a dark brown fluffy solid. The dark brown fluffy solid was then put into a box furnace for a heat treatment at 1500° C. for 20 hours in a nitrogen atmosphere first, and then a heat treatment at 800° C. for 20 hours in an air atmosphere, to obtain rare-earth-doped YAG nanopowders, YAG: $Pr^{3+}$, with a particle size of 5000 nanometers.

Figure 8:
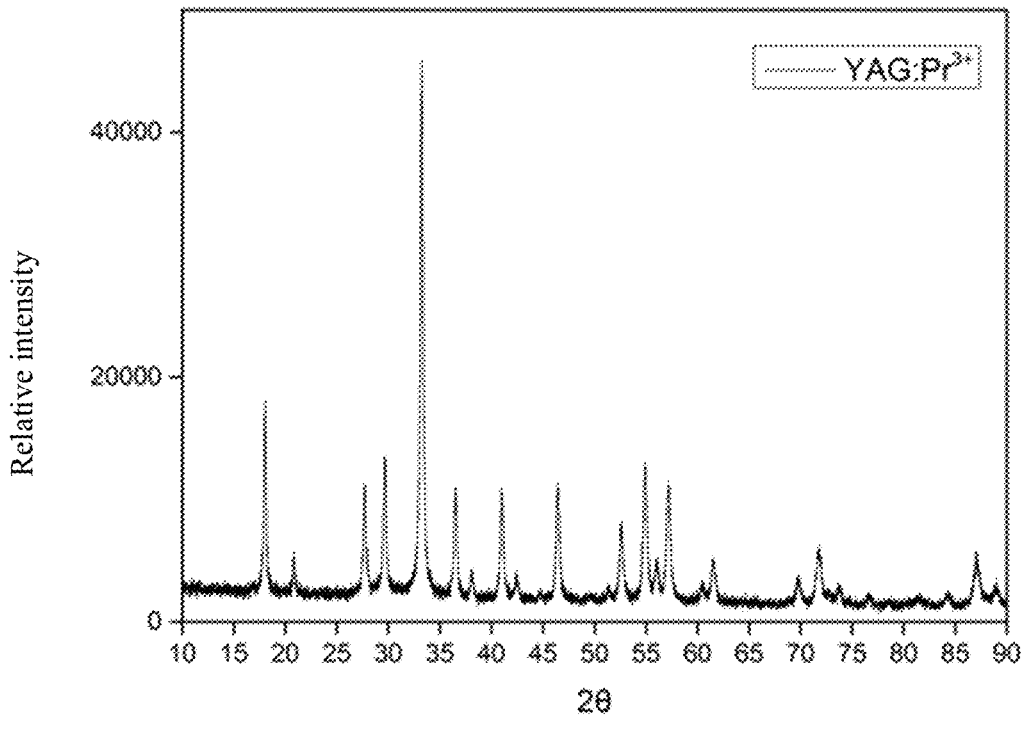
FIG. 8 is an XRD spectrum of YAG: $Pr^{3+}$ made according to another example embodiment of the disclosure.

FIG. 8 is an XRD spectrum of the YAG: $Pr^{3+}$ made according to the above example embodiment. As shown in FIG. 8, the obtained YAG: $Pr^{3+}$ has a good crystal form and no impurity peak.

In the method for making the YAG nanopowders consistent with the embodiments of the present disclosure, a size and purity of the YAG nanopowders can be effectively controlled by controlling synthesis conditions, for example, a ratio of raw materials, a reaction temperature, microwave conditions, a calcination temperature and duration. Carbohydrate and organic amine are mixed to form a homogeneous eutectic system. Then yttrium salt and aluminum salt are added. The metal salt is uniformly distributed in the mixed solution by stirring. A small part of the organic amine may be decomposed during the heating process to continuously generate ammonia gas. The ammonia gas is dissolved in the mixed solution to provide a weak alkaline environment, which can effectively prevent agglomeration of the YAG during the making process. The carbohydrate is carbonized rapidly after microwave heating, providing a carbon template to cause the metal salt to be evenly distributed on the carbon template, thereby effectively preventing the agglomeration of the YAG. The distribution and uniformity of metal/oxide particles in porous carbon are determined by self-assembly of the carbohydrate-urea-salt system. The microwave provides a form of rapid carbonization. Microwave treatment makes the sol-gel reaction proceed relatively fast, nucleate relatively fast, and with high efficiency, thereby causing the size of the particles to be relatively small. The carbon templet can be easily removed during the calcination process to obtain high-purity YAG nanopowders. The carbon templet causes the metal salt derived nanoparticles to be evenly distributed on the carbon template. The carbon templet can be removed by oxidation in air or oxygen during the calcination process to obtain the high-purity YAG nanopowders. On one hand, the method consistent with the embodiments of the present disclosure simplifies the process flow, shortens the making period, and reduces the making cost. The microwave provides energy for the reaction system to cause the temperature to increase rapidly, thereby speeding up the sol gel process. On the other hand, the method also reduces the aggregation of particles. Therefore, the made YAG nanopowder has advantages of regular shape, uniform particle size, good powder fluidity and filling, and high purity. The method consistent with the embodiments of the present disclosure is suitable for industrial production.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for making yttrium aluminum garnet (YAG) nanopowders, comprising:

mixing carbohydrate and organic amine in a container according to a first ratio, stirring the carbohydrate and organic amine in the container under a heating condition approximately from 25° C. to 180° C. for 2 minutes to 120 minutes for melting the carbohydrate and the organic amine to obtain a clear and transparent mixed solution;

adding yttrium salt, aluminum salt, and one of rare earth salt and transition metal salt to the clear and transparent mixed solution, and stirring the yttrium salt, the aluminum salt, and the clear and transparent mixed solution in the container under the heating condition approximately from 25° C. to 180° C. for 5 minutes to 120 minutes for dissolving the yttrium salt and the aluminum salt in the clear and transparent mixed solution to form a uniform molten mixture, wherein a molar ratio between one, of rare earth element in the rare earth salt and transition metal element in the transition metal salt, and yttrium in the yttrium salt as 1: (10-300);

heating the uniform molten mixture to dehydrate and carbonize the carbohydrate to obtain a dark brown fluffy solid; and performing a heat treatment on the dark brown fluffy solid at 800° C. to 1500° C. for 2 hours to 40 hours to obtain the YAG nanopowders.

2. The method of claim 1, wherein:

the yttrium salt includes at least one of nitrate, sulfate, oxalate, acetate, phosphate, hypochlorite, or halide salt;

the aluminum salt includes at least one of nitrate, sulfate, oxalate, acetate, phosphate, hypochlorite, or halide salt;

the rare earth salt or transition metal salt includes at least one of nitrate, sulfate, oxalate, acetate, phosphate, hypochlorite, or halide salt.

3. The method of claim 1, wherein heating the uniform molten mixture to dehydrate and carbonize the carbohydrate to obtain the dark brown fluffy solid includes:

microwaving the uniform molten mixture to dehydrate and carbonize the carbohydrate to provide a carbon templet to cause the yttrium salt, the aluminum salt, and the rare earth salt or transition metal salt to be evenly distributed on the carbon templet.

4. The method of claim 3, wherein performing the heat treatment on the dark brown fluffy solid at 800° C. to 1500° C. for 2 hours to 40 hours to obtain the YAG nanopowders includes:

performing the heat treatment on the dark brown fluffy solid to remove the carbon templet.

5. The method of claim 1, wherein:

the carbohydrate includes at least one of glucose, sucrose, fructose, lactose, starch, maltose, or ribose;

the organic amine includes at least one of aliphatic amine, alcohol amine, amide, alicyclic amine, aromatic amine, or naphthalene amine; and the first ratio includes a mass ratio of the carbohydrate and the organic amine as 1: (0.1-50).

6. The method of claim 1, wherein heating the uniform molten mixture to dehydrate and carbonize the carbohydrate to obtain the dark brown fluffy solid includes:

heating the uniform molten mixture to dehydrate and carbonize the carbohydrate to obtain the dark brown fluffy solid using at least one of high temperature carbonization, hydrothermal carbonization, or microwave carbonization.

7. The method of claim 1, wherein performing the heat treatment on the dark brown fluffy solid at 800° C. to 1500° C. for 2 hours to 40 hours to obtain the YAG nanopowders includes:

performing the heat treatment on the dark brown fluffy solid in at least one of an air atmosphere, an oxygen atmosphere, or an atmosphere with first inert gas and then air or oxygen.

8. The method of claim 1, wherein the obtained YAG nanopowders have a particle size of 20 nanometers to 5000 nanometers.

9. The method of claim 8, wherein performing the heat treatment on the dark brown fluffy solid at 800° C. to 1500° C. for 2 hours to 40 hours to obtain the YAG nanopowders includes:

performing the heat treatment on the dark brown fluffy solid to remove the carbon templet.

10. The method of claim 1, wherein the obtained YAG nanopowders have a particle size of 20 nanometers to 100 nanometers.

11. The method of claim 1, wherein heating the uniform molten mixture to dehydrate and carbonize the carbohydrate to obtain the dark brown fluffy solid includes:

microwaving the uniform molten mixture to dehydrate and carbonize the carbohydrate to provide a carbon templet to cause the yttrium salt and the aluminum salt to be evenly distributed on the carbon templet.

12. A method for making yttrium aluminum garnet (YAG) nanopowders, comprising:

mixing carbohydrate and organic amine in a container according to a first ratio, stirring the carbohydrate and organic amine in the container under a heating condition approximately from 25° C. to 180° C. for 2 minutes to 120 minutes for melting the carbohydrate and the organic amine to obtain a clear and transparent mixed solution;

adding yttrium salt, aluminum salt, and one of rare earth salt and transition metal salt to the clear and transparent mixed solution, and stirring the yttrium salt, the aluminum salt, and the clear and transparent mixed solution in the container under the heating condition approximately from 25° C. to 180° C. for 5 minutes to 120 minutes for dissolving the yttrium salt and the aluminum salt in the clear and transparent mixed solution to form a uniform molten mixture, wherein a ratio between total moles of yttrium in the yttrium salt, aluminum in the aluminum salt, and one of rare earth element in the rare earth salt and transition metal element in the transition metal salt, and moles of the carbohydrate as (0.2-3): 1;

heating the uniform molten mixture to dehydrate and carbonize the carbohydrate to obtain a dark brown fluffy solid; and performing a heat treatment on the dark brown fluffy solid at 800° C. to 1500° C. for 2 hours to 40 hours to obtain the YAG nanopowders.

13. The method of claim 12, wherein:

the yttrium salt includes at least one of nitrate, sulfate, oxalate, acetate, phosphate, hypochlorite, or halide salt;

the aluminum salt includes at least one of nitrate, sulfate, oxalate, acetate, phosphate, hypochlorite, or halide salt;

the rare earth salt or transition metal salt includes at least one of nitrate, sulfate, oxalate, acetate, phosphate, hypochlorite, or halide salt.

14. The method of claim 12, wherein:

the carbohydrate includes at least one of glucose, sucrose, fructose, lactose, starch, maltose, or ribose;

the organic amine includes at least one of aliphatic amine, alcohol amine, amide, alicyclic amine, aromatic amine, or naphthalene amine; and the first ratio includes a mass ratio of the carbohydrate and the organic amine as 1: (0.1-50).

15. A method for making yttrium aluminum garnet (YAG) nanopowders, comprising:

mixing carbohydrate and organic amine in a container according to a first ratio, stirring the carbohydrate and organic amine in the container under a heating condition approximately from 25° C. to 180° C. for 2 minutes to 120 minutes for melting the carbohydrate and the organic amine to obtain a clear and transparent mixed solution;

adding yttrium salt and aluminum salt at a second ratio to the clear and transparent mixed solution, and stirring the yttrium salt, the aluminum salt, and the clear and transparent mixed solution in the container under the heating condition approximately from 25° C. to 180° C. for 5 minutes to 120 minutes for dissolving the yttrium salt and the aluminum salt in the clear and transparent mixed solution to form a uniform molten mixture;

heating the uniform molten mixture to dehydrate and carbonize the carbohydrate to obtain a dark brown fluffy solid; and performing a heat treatment on the dark brown fluffy solid at 800° C. to 1500° C. for 2 hours to 40 hours to obtain the YAG nanopowders, wherein the second ratio includes a molar ratio between yttrium in the yttrium salt and aluminum in the aluminum salt as 1: (1-4).

16. The method of claim 15, wherein:

the yttrium salt includes at least one of nitrate, sulfate, oxalate, acetate, phosphate, hypochlorite, or halide salt;

the aluminum salt includes at least one of nitrate, sulfate, oxalate, acetate, phosphate, hypochlorite, or halide salt;

the rare earth salt or transition metal salt includes at least one of nitrate, sulfate, oxalate, acetate, phosphate, hypochlorite, or halide salt.

17. The method of claim 15, wherein:

the carbohydrate includes at least one of glucose, sucrose, fructose, lactose, starch, maltose, or ribose;

the organic amine includes at least one of aliphatic amine, alcohol amine, amide, alicyclic amine, aromatic amine, or naphthalene amine; and the first ratio includes a mass ratio of the carbohydrate and the organic amine as 1: (0.1-50).

* * * * *